MODULAR COMPUTER SYSTEM

Filed March 1, 1962 4 Sheets-Sheet 1

INVENTORS
RICHARD H. FULLER
RALPH J. KOERNER
EDWARD J. SCHNEBERGER
BY Arthur Frölich
AGENT INVENTORS
RICHARD H. FULLER
RALPH J. KOERNER
EDWARD J. SCHNEBERGER
BY Arthur Freilich
AGENT INVENTORS
RICHARD H. FULLER
RALPH J. KOERNER
EDWARD J. SCHNEBERGER
BY Arthur Freilich
AGENT

MODULAR COMPUTER SYSTEM

Filed March 1, 1962

4 Sheets-Sheet 4

RICHARD H. FULLER
RALPH J. KOERNER
EDWARD J. SCHNEBERGER
INVENTORS

BY Arthur Freilich

AGENT

United States Patent Office 3,226,692
Patented Dec. 28, 1965

3,226,692

MODULAR COMPUTER SYSTEM

Richard H. Fuller, Los Angeles, and Ralph J. Koerner and Edward J. Schneberger, Canoga Park, Calif., assignors, by mesne assignments, to The Bunker-Ramo Corporation, Stamford, Conn., a corporation of Delaware Filed Mar. 1, 1962, Ser. No. 176,603
19 Claims. (Cl. 340—172.5)

This invention relates generally to a modular computer system of the type discussed in the following patent applications: "Modular Computer System," Lowell D. Amdahl et al., filed July 3, 1961, Serial No. 121,593; "Modular Computer System Connection Rejection Capability," Lowell D. Amdahl et al., filed July 3, 1961, Serial No. 121,458; "Modular Computer System Master Disconnect Capability," Lowell D. Amdahl et al., filed July 3, 1961, Serial No. 121,594; and more particularly, to an improved system characterized by a symbolic addressing feature whereby controlling modules can gain access to desired controlled modules by generating connection commands spcifying a symbolic rather than the physical address of the desired controlled module.

In the first above-identified co-pending application, a modular computer system is discussed in which any one of a plurality of controlling modules (devices capable of executing their own stored programs) can communicate through a central switching network or excange with any one of a plurality of controlled modules by generating a command under the influence of its stored program, to cause the establishment of a communication path within this exchange with the particular controlled module addressed by the command. The term "controlling modules" encompasses computers or buffers (computers without arithmetic capability) while the term "controlled modules" encompasses devices such as storage devices and input-output equipment which are generally not capable of executing stored programs. The communication paths between controlling and controlled modules are established by selective closure of switch connections within the central exchange. The exchange comprises a rectangular switching matrix of at least MN sets of crosspoints in a system including M controlling modules and N controlled modules. The controlling modules are connected to one axis of the matrix while the controlled modules are connected to the other axis. Means responsive to the stored programs of each controlling module energize appropriate sets of crosspoints to establish connections.

The second above-identified application discloses a modular computer system utilizing the central exchange concept and characterized initially by its ability to reject connection commands from controlling modules when the addressed controlled module is "busy," i.e., already interconnected with a controlling module and secondly by its utilization of certain modules as both controlling and controlled modules, i.e., connected to both axes of the rectangular switching matrix.

The third above-identified applications disclose a modular computer system utilizing the central exchange concept and characterized by a feature whereby access to certain controlled modules can be restricted to certain preselected controlling modules and by the inclusion of a special controlled module which is capable of responding to commands from a controlling module having access to it, to break connections between other controlling modules and other controlled modules.

The differences between a modular type computer system organized around a central switching matrix and other system organizations of the prior art are noteworthy. Inasmuch as conventional computer systems are typically organized with the digital computer as a central element, with all peripheral devices under the exclusive control thereof, system capacity, size, speed and reliability are limited by the characteristics of the computer. For this reason, the computer art has developed principally in terms of larger and faster computers. In contrast to this development, a modular computer system organized around a central switching matrix permits system control to be distributed and system capacity, size and speed to be determined by the user's requirements. More particularly, organization around a central switching matrix permits the concurrent utilization of several computers so that simultaneous data handling operations can be effected for rapidly solving complex problems. In addition, the use of a central switching matrix permits the most efficient deployment of available equipment to be applied to the solution of any of various and diverse problems. Further, the utilization of a multiplicity of smaller modules rather than fewer larger units, permits a user to match his system equipment with his present needs and expand his equipment and capabilities in small increments as his needs grow. Still further, whereas in conventional systems, the central computer limits the reliability of the entire system, modularity permits decentralization resulting in increased reliability inasmuch as a single module failure cannot disable an entire system.

It is an object of the present invention to provide a modular computer system which is simpler to utilize and more flexible in operation than heretofore described systems.

It is an additional object of this invention to provide a modular computer system including means responsive to the use of generic operating programs by the controlling modules to thereby obviate the necessity of recompiling programs before each run.

It is still an additional object of this invention to provide a more efficient design of a modular computer system such that less hardware is required than in previously described systems of comparable capability.

One of the particularly significant advantages attending the type of modular computer organization utilizing the central switch concept discussed in the above-identified applications is that different pairs of modules can be in communication concurrently; i.e., controlling module YA, for example, can be connected to controlled module X2 while controlling module YB is connected to controlled module X1, and yet each of the controlling modules has the ability to establish communication with any controlled module, subject to certain desirable system restraints. This concurrent communication capability permits the simultaneous solution of several different problems or the simultaneous partial solution of a single problem. To illustrate a case in point, assume that an extensive problem need be performed rapidly with respect to the modification of payroll data of several hundred thousand persons stored on several reels of tape. In order to rapidly complete the task, a pair of computers could perform the necessary operations each with respect to one-half of the data. Although each of the computers would be performing the same sequence of operations, their programs would have to differ with regard to the addresses of the particular modules being used by each, i.e., for example, tape units and buffers. Inasmuch as in the systems described in the above-identified applications, the controlling modules generated connection commands including appropriate physical addresses, it was necessary prior to running a program on a particular computer, to recompile the program to include the proper physical addresses of all necessary modules. A feature of the present invention obviates the necessity for recompilation by permitting the utilization of symbolic addressing such that a generic program (i.e., a program suitable for use on any system computer without modification) can be run by incorporating a translation procedure in each connection establishing sequence. The translation procedure involves automatically looking up the designated symbolic address in a table uniquely associated with the commanding controlling module and utilizing as a connection address the stored physical address in the table associated therewith.

Since several programs can be running simultaneously in the system, it is desirable to incorporate an assignment capability, i.e., the ability to prevent communication between certain controlling modules and certain controlled modules so that unnecessary communication paths can be blocked to minimize the possibility of one program interferring with another. This is particularly important where, for example, secret defense information is being processed by one computer and it is desired to safeguard against the possibility of incorrect connections arising which might allow the information to be handled by another system computer and perhaps inadvertently outputted.

Accordingly, an additional feature of the present invention is the utilization of the symbolic addressing technique for purposes of assignment; i.e., to restrict access of certain controlling modules to certain controlled modules by omitting from the translation table uniquely associated with the controlling module, the physical address of the controlled module to which access is not permitted.

A still additional feature of the present invention involves the incorporation of the means for accomplishing the symbolic addressing and assignment functions in a switch control module which can be connected to a position on the axis of the central switching matrix to which the various controlled modules are connected.

In a multiple computer system, it is advantageous to be able to designate one computer as master in order to allow it to maintain adequate control over the system by changing assignments as appropriate to more efficiently handle the work load and break connections when necessary to, for example, give priority attention to certain problems.

Accordingly, a still additional feature of the present invention involves the facility for designating one controlling module as a master controlling module by confining the ability to modify the translation table uniquely associated with each controlling module to the designated master controlling module. In furtherance of a master-slave controlling module relationship, the system permits controlling modules to alert other controlling modules under program control to thereby, for example, facilitate the ability of a master controlling module to assign a task to another controlling module and recognize when the assigned controlling module has completed the task.

A still additional feature of the present invention involves the introduction of commutator means to sequentially sample controlling modules for connection commands in order to derive the benefits of cost reduction resulting from time sharing of the hardware.

Briefly, the invention suggests the introduction of a symbolic addressing technique in a modular computer system in order to realize significant advantages including the ability to run programs without recompiling them to include appropriate physical addresses of utilized modules. It is further recognized herein that the symbolic addressing techniques can be extended to facilitate the inclusion of an assignment capability and a master-slave controlling module relationship.

In accordance with the preferred embodiment of the invention shown herein, a switch control module is connected to a position on the axis of the central switching matrix to which the various system controlled modules are connected. Each of the system modules has data input and output lines which are connected in the switching matrix. In addition, a request line directly connects each controlling module to the switch control module. Controlling modules have the ability, under control of their stored programs, to both establish communication paths through the switching matrix between themselves and controlled modules and alert other controlling modules.

In order to establish a communication path through the switching matrix, a requesting control module generates a binary "1" on its request line, and a symbolic address designating the requested controlled module on its data lines. A commutator sequentially samples the request lines and in response to recognizing a binary "1," establishes a communication path through the switching matrix crosspoint connecting the data lines of the switch control module and the data lines of the requesting controlling module. The symbolic address is transferred from the requesting controlling module to the switch control module and by reference to a translation table uniquely associated with the requesting controlling module, a physical address is read out if the requested connection is permitted, and a "not assigned" signal is read out if the connection is not permitted.

The "not assigned" signal is coupled back to the requesting control module. The physical address is decoded and used so set a flip-flop controlling the matrix crosspoint connecting the requesting controlling module and the requested controlled module if the controlled module is not "busy"; i.e., if the controlled module is not already connected to a controlling module. If the controlled module is "busy," a command rejected signal is generated and coupled back to the requesting controlling module. If the controlled module is not busy, a command accepted signal is generated and coupled back to the requesting controlling module.

Control over the translation table is exercised through a translation table control module which is itself also connected to a position on the axis of the switching matrix to which the various system controlled modules are connected. Access to the translation table control module is, of course, governed by the translation table, accordingly permitting a high degree of control to be delegated to one or more controlling modules.

In order for a controlling module to alert a master controlling module, the system is provided with one or more alert flip-flops each capable of being set and reset by each controlling module in the system. The alert flip-flops are set and reset by the controlling modules in the same manner that connection requests are made; i.e., by submitting a request to the switch control module which makes reference to the translation table. This alert technique is extremely useful in permitting the master controlling module to keep track of the tasks being performed by the other controlling modules. For example, the last couple of operations in every sequence of controlling module operations could cause the controlling module to record identifying data on a "scratch pad" in a controlled module, a magnetic drum, for example and set an alert flip-flop. The master controlling module could recognize that the alert flip-flop has been set and respond thereto by resetting the alert flip-flop and connecting itself to the "scratch pad" to determine which controlling module completed its task. The technique can be extended beyond merely alerting for task completion; i.e., occurrences such as power failures or other equipment malfunctions could be brought to the attention of the master controlling module in the same manner.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

Figure 6:
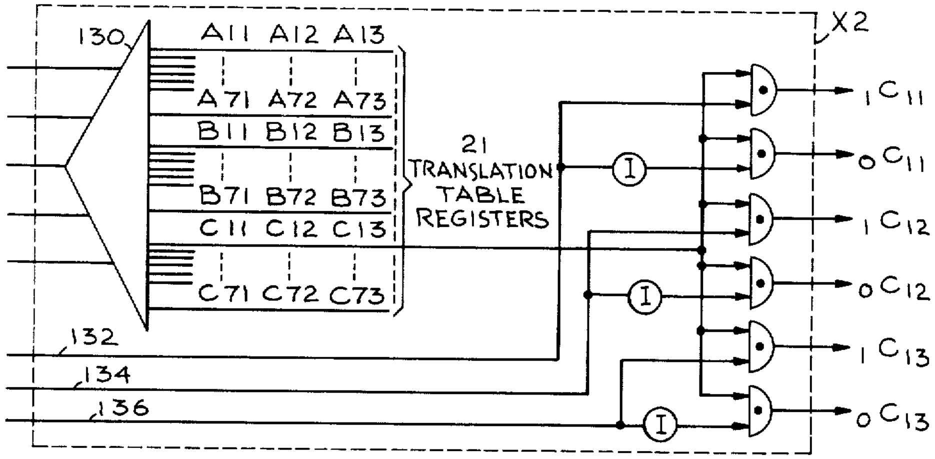
Figure 5A:
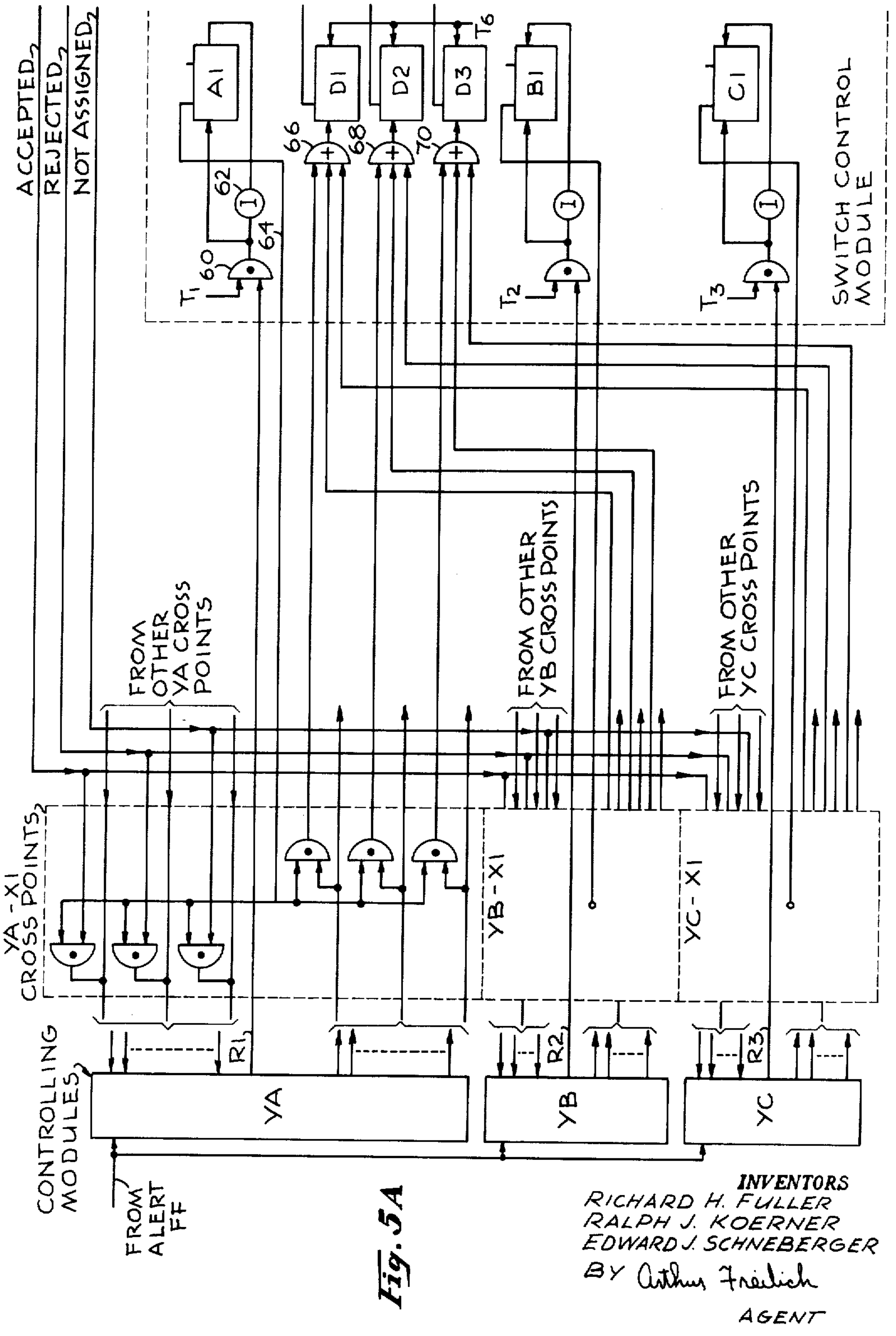
Figure 5B:
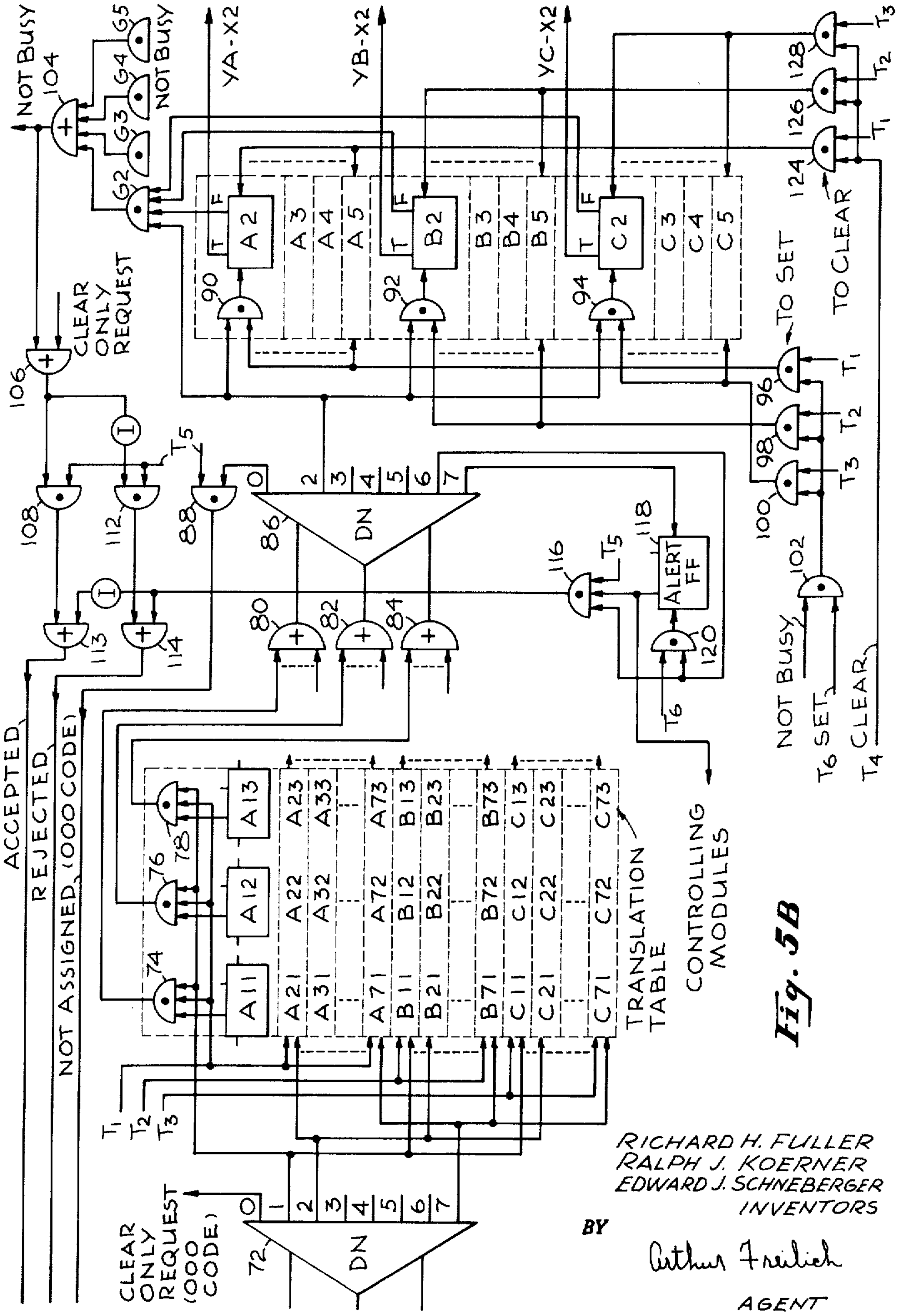

FIGS. 5(*a*) and 5(*b*) are a schematic diagram showing the details of the switch control module and its relationship to the controlling modules; and FIG. 6 is a schematic diagram of the translation table control module which permits controlling modules having access to its to modify the translation table in the switch control module.

Figure 1:
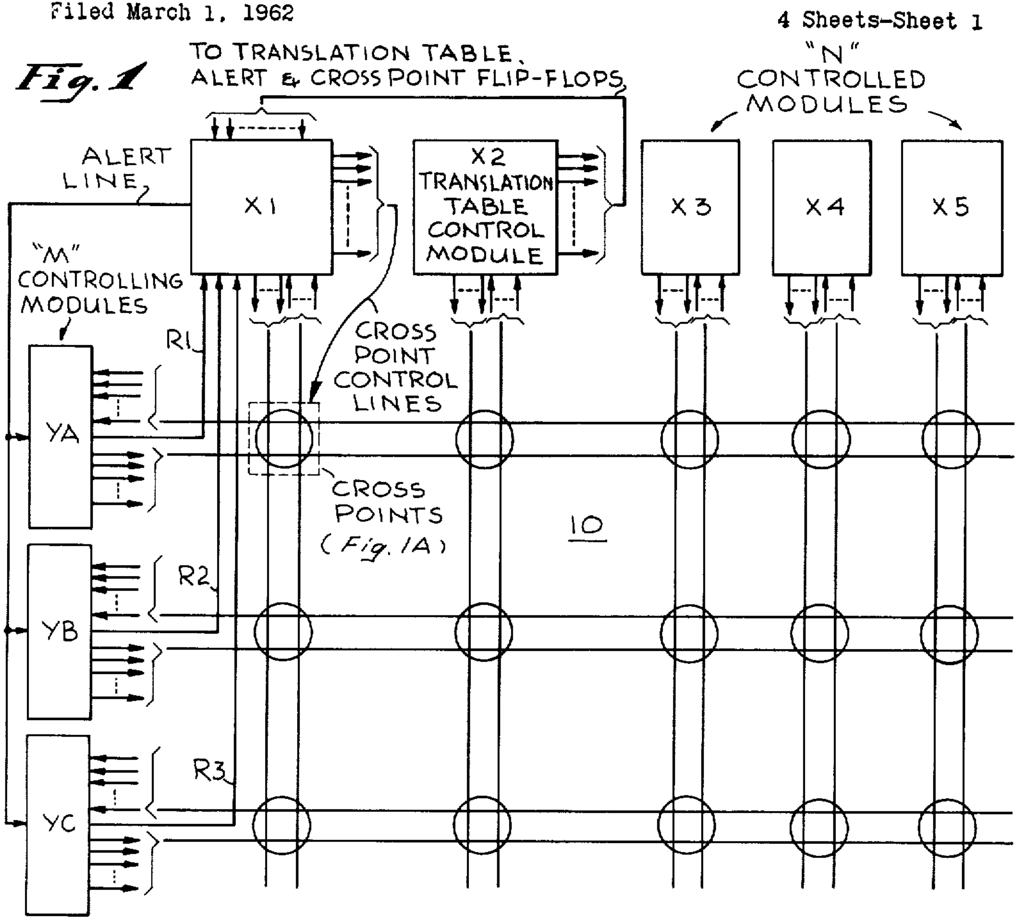
FIGURE 1 is a block diagram of the modular computer system showing the organization of the modules with respect to the central switching matrix and showing in the inset FIG. 1(*a*) a typical set of matrix crosspoints.
Figure 1A:
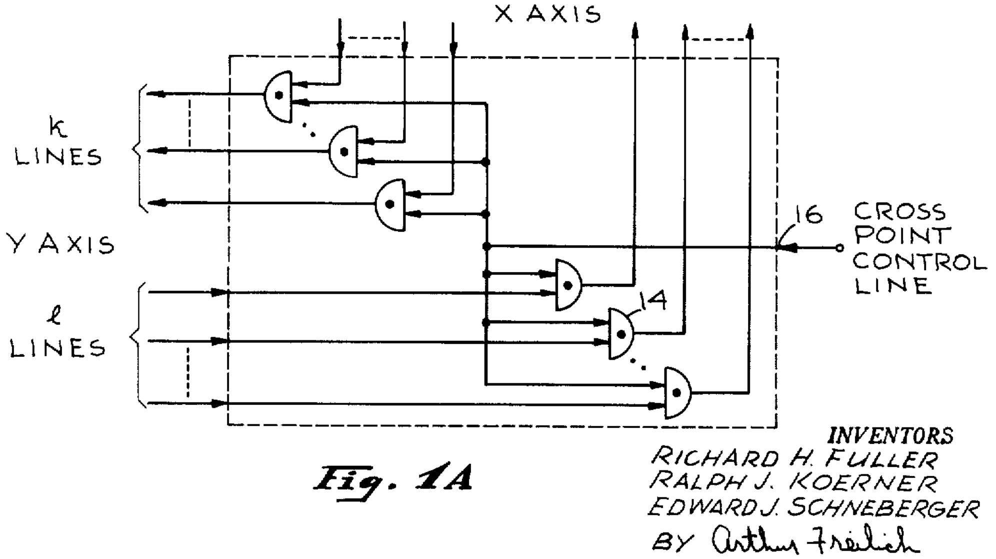

With continuing reference to the drawings, initial attention is called to FIG. 1 wherein is illustrated the generalized modular computer system organization incorporating the features of the present invention. Although the teachings herein are applicable to systems including M controlling modules and N controlled modules, for simplicity in explanation the embodiment shown includes only three controlling modules and five controlled modules.

The controlling modules YA, YB, YC comprise devices capable of operating under their own stored programs such as digital computers and buffers (computers not having arithmetic capability). The controlled modules X1, X2, X3, X4, X5 on the other hand constitute special purpose logic devices, transitional storage devices such as magnetic drums, file storage devices such as tape units, input devices such as tape readers, and output devices such as printers. The controlling modules are each provided with $l$ data output lines and $k$ data input lines while the controlled modules are each provided with $k$ data output lines and $l$ data lines. In addition, each controlling module YA, YB, YC is respectively provided with a request line R1, R2 and R3. The request lines and all of the data lines are connected to registers (not shown) within the modules. The registers may consist of flip-flops or other well known digital storage devices which are capable of representing information on these lines by the establishment thereon of one of two possible discrete voltage levels; e.g., a high voltage level may be representative of a "1" or a true condition and a low voltage level may be representative of a "0" or a false condition.

The system organization contemplates the interconnection of any one of the controlling modules to any one of the controlled modules in response to a programmed command of the former, subject to certain desirable system restraints. It is stipulated that each controlling module in the system has the capability of generating a switch request thereby setting its request line "true" and providing an address (symbolic) on its other data output lines. Inasmuch as the exemplary system shown herein employs only five controlled modules, three data output lines are sufficient to carry the address information. An exchange or switching matrix 10 is provided to actually implement the establishment of communication paths between requesting controlling modules and requested controlled modules. The matrix 10 may be considered as rectangular in nature defining a horizontal or X axis and a vertical or Y axis. The controlled modules X1, X2, X3, X4, X5 are connected to positions along the X axis while the controlling modules YA, YB, YC are connected to positions along the Y axis. The matrix 10 includes a plurality of sets of crosspoints, each set of crosspoints uniquely associated with a controlling and a controlled module. For example, a set of crosspoints YB–X2 is associated with controlling module YB and controlled module X2. Each set of crosspoints includes a plurality of individual crosspoints which connect respective output data lines of controlling modules to input data lines of controlled modules and output data lines of controlled lines to input data lines of controlling modules. Accordingly, since it has been indicated that each controlling module is provided with $l$ output lines and $k$ input lines, each set of crosspoints includes $l+k$ crosspoints.

Reference is momentarily made to FIG. 1(*a*) wherein is shown the details of a typical set of crosspoints utilizing ($l=k$) two input AND gates 14. Forming one of the inputs to each of the AND gates is a crosspoint control line 16. Forming the second input to each of the AND gates is a unique output line from either a controlling module on the Y axis or a controlled module on the X axis. The outputs of the AND gates having an input originating on the Y axis are connected to the input lines of a controlled module on the X axis. On the other hand, the outputs of the AND gates having an input originating on the X axis are connected to the input lines of a controlling module on the Y axis. It is pointed out that the AND gates 14 need only be capable of performing a logical AND function, that is of providing a true output only when both inputs are true and many different implementations well known in the art will satisfy this function.

Controlled module X1 comprises a special purpose logic device to be more particularly described below. It is here pointed out, however, that request lines R1, R2, R3 from controlling modules YA, YB, YC, respectively, are connected directly to controlled module X1. The additional $l+k$ lines associated with each controlling module are coupled to each of the controlled modules through sets of crosspoints of the type illustrated in FIG. 1(*a*).

Module X1 performs a special function in the system. Particularly, it will be noted that 15 crosspoint control lines emerge from module X1. Each of the crosspoint control lines is uniquely associated with one of the sets of crosspoints in the manner shown in FIG. 1(*a*). In addition, an alert line which emerges from module X1 is connected directly to each of the controlling modules YA, YB and YC. Still further, module X1 is provided with another plurality of input lines which are directly connected to output lines emerging from controlled module X2. The lines emerging from controlled module X2 are utilized to control the translation table, to be henceforth described, forming part of the logical structure of module X1. Accordingly, controlled module X2 will be hereafter also referred to as the translation table control module. Controlled module X1, serving to control the crosspoint control lines to in turn control the sets of crosspoints in the switch matrix, will also be called the switch control module.

As previously pointed out, controlled modules X3, X4, X5 may comprise transition storage devices, file storage devices, input devices or output devices depending upon the user's requirements. Inasmuch as the system would function substantially identically regardless of the particular character of the controlled modules X3, X4 and X5, their particular character will not be discussed further other than perhaps in a functional sense. The controlling modules, as already indicated, generally comprise stored program devices such as digital computers. The controlling modules are capable of generating connection requests under the influence of their stored program for the purpose of establishing communication with a controlled module through the switch matrix 10. In order to generate a connection request, a controlling module sets its request line true and provides an address on its data output lines. The connection request is recognized by the switch control module X1 and subject to certain desirable system restrictions, sets the appropriate crosspoint control line true to activate a particular set of crosspoints for establishing a communication path between the requesting controlling module and the request controlled module.

Figure 2:
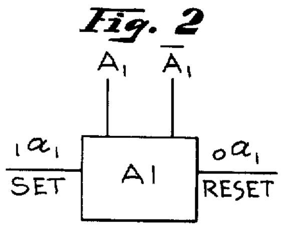
FIG. 2 is a block diagram of a typical flip-flop used throughout the several figures shown to illustrate the nomenclature employed with reference thereto.
Figure 3:
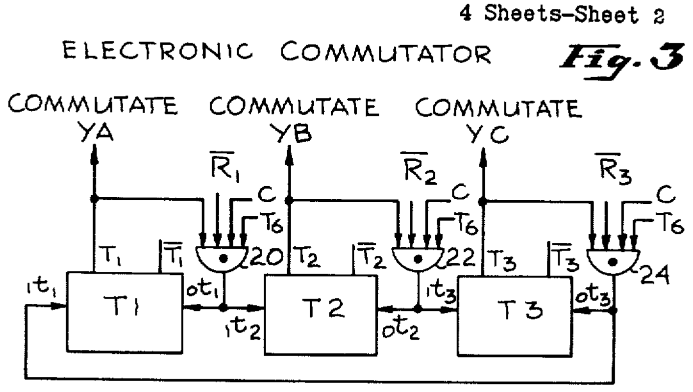
FIG. 3 is a schematic diagram of the electronic commutator utilized in the switch control module to sequentially sample controlling module request lines.
Figure 4:
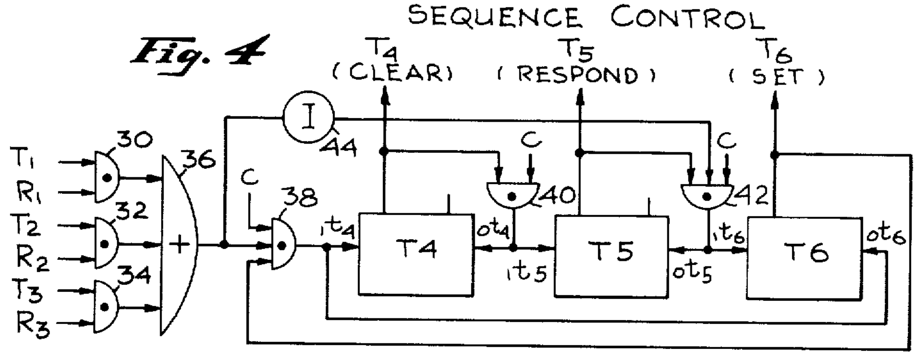
FIG. 4 is a schematic diagram of a sequence control circuit utilized in the switch control module to sequence the events necessary to establish connections through the switching matrix.

Prior to discussing the implementation and operation of the complete switch control module X1, reference is made to FIGS. 2, 3 and 4 which shows portions thereof and are treated separately in order to facilitate an understanding of the operation of the module X1.

In FIG. 2, an exemplary flip-flop is illustrated. Inasmuch as various flip-flops will be referred to hereinafter, it is thought advisable at this stage to establish a nomenclature with respect thereto. The following nomenclature will henceforth be utilized; if the flip-flop be designated A1, then the input signal applied to the "set" input terminal horizontally entering the left side of the flip-flop which sets the flip-flop true is referred to as ${}_1a_1$. A high voltage level output signal representing the true state of the flip-flop applied to the true ouput or left terminal emerging from the top of the flip-flop is referred to as $A_1$. The input signal applied to the "reset" input terminal horizontally entering the right side of the flip-flop which resets the flip-flop false is referred to as ${}_0a_1$. A high voltage level output signal representing the false state of the flip-flop applied to the false output or right terminal emerging from the top of the flip-flop is referred to as $\overline{A}_1$. Where the input to a gate is represented as $A_1$ it will be understood as meaning that a true logical level is being applied to the gate when flip-flop A1 is true. The request lines have been designated at R1, R2, R3 representing the notation of the unshown flip-flop to which they are connected. It should be understood however that the signal thereon when true is represented by $R_1$ and when false by $\overline{R}_1$. Where it has been thought that logical equations would facilitate an understanding of the invention, they have been incorporated in the specification using the nomenclature here introduced.

Attention is now directed to FIG. 2(*b*) wherein an electronic commutator utilized to sequentially sample the output lines of the various system controlling modules is illustrated. Inasmuch as the exemplary system disclosed includes three controlling modules, the commutator has been provided with three flip-flops T1, T2, T3 in order to establish three distinct commutation states in which to sample the three request lines R1, R2, R3. Each of the three distinct commutation states is defined by a different one of the flip-flops being true and accordingly the states are referred to as $T_1$, $T_2$, $T_3$. A clock signal C is provided which emanates from any stable oscillator source (not shown). The flip-flop T1, T2, T3 are interconnected by AND gates 20, 22 and 24. The commutator essentially comprises a ring counter which in response to the clock signal C continues to step through its states sampling the request line of a controlling module in each state. When a sampled request line is true, meaning that its associated controlling module is providing a connection request, the commutator is disabled from further counting until the controlled module resets the request line. The resetting action of the controlling module will be discussed below.

In the operation of the commutator, assume that flip-flop T1 is initially true thereby defining state $T_1$. If request line R1 is false meaning that controlling module YA is not generating a switch request, and if the sequence control of FIG. 4, to be discussed below, is in timing state $T_6$, at the next clock pulse, the output of AND gate 20 will be true thereby resetting flip-flop T1 and setting flip-flop T2. If request line R2 of controlling module YB is false and if the sequence control is in timing state $T_6$, at the succeeding clock pulse, the output of gate 22 will be true and flip-flop T2 will be reset and flip-flop T3 set. Similarly, if at the next succeding clock pulse request line R3 of controlling module YC is false and the sequence control is in its timing state $T_6$, the output of AND gate 24 will be true resetting flip-flop $T_3$ and setting the flip-flop $T_1$. Accordingly, it will be appreciated that so long as the request lines R1, R2, R3 are false when they are respectively sampled in commutation states $T_1$, $T_2$, $T_3$, the commutator will continue to cycle. When, however, one of the controlling modules, for example YA, generates a switch request, it will set its request line R1 and accordingly the commutator will remain in commutation state $T_1$ so long as R1 remains true. This, of course, is apparent upon a realization that the logical inverse of the state of the request line R1 constitutes one of the inputs to AND gate 20.

Attention is now directed to the sequence control circuit of FIG. 4. The sequence control includes flip-flops T4, T5, T6 and is provided for establishing timing states $T_4$, $T_5$, $T_6$ during commutation states in which connection requests are recognized. Normally, the sequence control is idle in state $T_6$ with flip-flops T4 and T5 thereof false and flip-flop T6 thereof true. It is desired that the sequence control be caused to count out of its idle state when a request line is recognized as being true. Accordingly, AND gates 30, 32, 34 are provided having as their respective inputs $T_1$ and $R_1$, $T_2$ and $R_2$, $T_3$ and $R_3$. The outputs of the AND gates 30, 32, 34 comprise the inputs to an OR gate 36 whose output in turn comprise one of the inputs to AND gate 38. It should be realized when a true request line is recognized during an appropriate commutation state, one of the AND gates 30, 32, 34 will present a true output. Accordingly, the output of OR gate 36 will be true. Signal $T_6$ comprises the second input to AND gate 38 and the clock signal C comprises the third input. The output of gate 38 is connected to the set input terminal of flip-flop T4 and to the reset input terminal of flip-flop T6. Accordingly, assuming that the sequence control is initially in state $T_6$, a true output of gate 38 will set flip-flop T4 and reset flip-flop T6. Signal $T_4$ together with clock signal C is applied to AND gate 40 whose output is connected to the reset input terminal of flip-flop T4 and the set input terminal of flip-flop T5. Similarly, signals $T_5$ and C are applied to AND gate 42 whose output is connected to the reset input terminal of flip-flop T5 and the set input terminal of flip-flop T6. In addition, the output signal of OR gate 46, inverted by inverter 44, is applied to AND gate 42.

Attention is called to FIG. 5 wherein are illustrated the details of the switch control module X1 and its relationship to the controlling modules and matrix crosspoints. Inasmuch as the relationship between each of the controlling modules YA, YB, YC and the switch control module X1 is subtsantially the same, principal attention will hereinafter arbitrarily be devoted to controlling module YA and reference will be made to controlling modules YB, YC only where it is considered that such reference will facilitate an understanding of the invention.

Attention is initially directed to FIG. 5(*a*). Request line R1 together with the true output terminal of flip-flop T1 of FIG. 3 are connected to the input of AND gate 60 of switch control module X1. The output of AND gate 60 is connected directly to the set input terminal of crosspoint flip-flop A1 and through an inverter 62 to the reset input terminal thereof. The true output terminal of crosspoint flip-flop A1 comprises the crosspoint control line which controls the set of crosspoints in the switch matrix 10 which interconnects position A on the Y axis of the matrix with position 1 of the X axis of the matrix. This crosspoint control line is designated 64 and comprises one input to each of the AND gates forming the YA–X1 set of crosspoints. As previously pointed out, the other input to each of the crosspoint AND gates comprises the output data lines of each of the associated controlling AND controlled modules while the output of the AND gates are connected to the input data lines of each of the associated controlling and controlled modules.

In the absence of a switch request from controlling module YA, request line R1 is false. When controlling module YA generates a switch request however, it sets line R1. When the commutator of FIG. 3 next defines state $T_1$, crosspoint flip-flop A1 is set so as to enable all of the crosspoint AND gates interconnecting the data lines of controlling module YA and controlled module X1 to thereby establish a communication path between the modules. The data output lines of the controlling module YA are respectively connected to the inputs of OR gates 66, 68, 70 together with corresponding output data lines from each of the other system controlling modules YB, YC. Whereas controlling module YA is associated with crosspoint flip-flop A1, controlling modules YB and YC are respectively associated with crosspoint flip-flops B1 and C1. Similarly, whereas signal $T_1$ is provided to AND gate 60, signals $T_2$ and $T_3$ are respectively provided to the AND gates associated with flip-flops B1 and C1. Since the commutator successively defines its three possible states $T_1$, $T_2$, $T_3$, it will be appreciated that only one of the three crosspoint flip-flops A1, B1 and C1 can be set at any one time. Accordingly, the outputs of OR gates 66, 68 and 70 at any one time reflect the output of either controlling module YA or YB or YC depending upon the state of the commutator.

The output of OR gates 66, 68 and 70 are respectively connected to the set input terminals of flip-flops D1, D2 and D3. The reset input terminals of flip-flops D1, D2 and D3 are connected to the true output terminal of flip-flop T6 of the sequence control of FIG. 4. The true output terminals of flip-flops D1, D2 and D3 comprise the inputs to decoding network 72. Decoding network 72 is in turn provided with eight output lines, each of which is energized in response to a unique input combination to the decoding network.

In order to facilitate an understanding of the invention to this point, the functions so far performed are here reviewed. The commutator of FIG. 3 will continue to cycle under the influence of the clock signal C so long as no controlling module request line is true when sampled. Assuming that controlling module YA generates a switch request, request line R1 is set so that when sampled, during state $T_1$, the commutator will stop and hold this state inasmuch as the equation for resetting flip-flop T1 and setting flip-flop T2 is $T_1$, $\overline{R}_1$, $T_6C$. In addition, the sequence control of FIG. 4 will count out of state T6 since the equation for resetting flip-flop and setting flip-flop T4 is $T_6C[T_1R_1+T_2R_2+T_3R_3]$. In addition, crosspoint flip-flop A1 will be set to in turn establish a communication path between the data lines of controlling module YA and switch control module X1. Further, address information comprising part of the controlling module switch request will appear on the data output lines of the controlling module and will pass through OR gates 66, 68 and 70 and be stored in flip-flops D1, D2 and D3. The stored address is thereafter decoded by decoding network 72 and one of eight lines of the decoding network is energized. Energization of any one of output lines 1–7 means that a connection request has been made for the purpose of establishing communication between the requesting controlling module and a controlled module. Whereas controlling modules normally generate switch requests comprising connection requests provision is made for recognizing an arbitrarily defined address of 000 stored in flip-flops D1, D2, D3 as a disconnect address which instead of establishing a communication path breaks any existent path involving the requesting controlling module. Storage of address 000 in flip-flops D1, D2, D3 causes output line 0 of decoding network 72 to be energized.

It has earlier been mentioned that in a multicomputer system, it is desirable to be able to utilize the same programs in each controlling module without requiring that the programs be recompiled to include appropriate controlled module physical addresses. Accordingly, provision is made for permitting the controlling modules to establish desired connections by outputting symbolic rather than physical addresses. The symbolic addresses are translated via a translation table to physical addresses which are utilized to establish the desired communication paths between controlling and controlled modules.

The translation table is illustrated in FIG. 5(*b*) as comprising three groups each including seven three-bit flip-flop registers. Groups A, B, C are respectively associated with controlling modules YA, YB, YC. Each translation table flip-flop is identified by a legend including its group, register, and bit position. Accordingly, the designation of flip-flop A13, for example, should be understood as referring to the flip-flop in the translation table which comprises the third bit of the physical address stored in the register associated with output line 1 of the decoding network 72 when requests from controlling module YA are being processed. Although the actual connections are illustrated only with respect to the first register in group A, similar connections exist with respect to all of the other registers in the translation table. Register 1 of group A includes flip-flops A11, A12 and A13. The true output terminal of each of these flip-flops is respectively connected to the input of AND gates 74, 76 and 78. In addition, output line 1 from decoding network 72 is connected to the input of each of the AND gates 74, 76 and 78. The true output terminal of flip-flop T1 of the commutator of FIG. 3 comprises the third input to each of the AND gates 74, 76 and 78.

Parenthetically, it is pointed out that the true output terminal of flip-flop T1 of the commutator is connected to the input of each of the AND gates associated with each of the flip-flops in group A of the translation table. Similarly, the true output terminal of flip-flop T2 is connected to the input of each of the AND gates associated with flip-flops in group B and the true output terminal of flip-flop T3 is similarly connected to the input of each of the AND gates associated with the flip-flops of group C. On the other hand, the output lines 1 through 7 of the decoding network 72 are respectively uniquely connected to the inputs of the AND gates of the corresponding register of each of groups A, B, C.

The translation table flip-flops are utilized to store physical addresses. The means for storing the desired physical addresses in the translation table flip-flops will be discussed below. For the present, it should be understood that storage of an address in flip-flops D1, D2, D3 causes one of the eight decoding network output lines to be energized and if the energized output line is one other than output line 0, the contents of a translation table register will be read out of three AND gates in the translation table. If, for example, it is assumed that during commutation states $T_1$ controlling module YA stored an address in flip-flops D1, D2 and D3 causing the energization of output line 1 of decoding network 72 then, the contents of flip-flops A11, A12 and A13 will be passed through AND gates 74, 76 and 78, respectively, to the inputs of OR gates 80, 82 and 84. The outputs of OR gates 80, 82 and 84 comprise the inputs to decoding network 86. Dependent upon the physical address read out from the translation table, one of the seven output lines of decoding network 86 in turn will be energized.

Output line 0 of decoding network 86 is connected to the input of AND gate 88 along with the true output terminal of flip-flop T5 of the sequence control. Output line 2 of decoding network 86 is connected to the input of each of AND gates 90, 92 and 94 whose outputs are respectively connected to the set input terminal of crosspoint flip-flops A2, B2 and C2. It will be recalled that crosspoint flip-flop A2 controls the communication path between controlling module YA and controlled module X2, crosspoint flip-flop B2 between controlling module YB and controlled module X2, etc. Each of output lines 3, 4 and 5 of decoding network 86 are similarly connected to AND gates connected to the set input terminals of cross point flip-flops. For example, output line 4 is connected as an input to the AND gate connected to the set input of crosspoint flip-flops A4, B4 and C4 which respectively control the communication paths between controlling modules YA, YB and YC and controlled module X4.

The second input to each of the AND gates connected to the set input terminals of the crosspoint flips-flops constitutes the output of AND gates 96, 98 and 100. Particularly, the output of AND gate 96 comprises the input to the AND gates associated with the set input terminals of crosspoint flip-flops A2–A5, the output of AND gate 98 comprises the second input to the AND gates associated with the set input terminal of crosspoint flip-flops B2–B5, and the output of AND gate 100 comprises the second input to the AND gates associated with the set input terminal of crosspoint flip-flops C2–C5. One input to each of the AND gates 96, 98 and 100, respectively, comprises the true output terminals of flips-flops T1, T2 and T3 of the commutator. The second input to each of the AND gates 96, 98 and 100 comprises the output of AND gate 102. The inputs to AND gate 102 comprise the true output terminal of flip-flop T6 of the sequence control and the output of OR gate 104 comprising a "not busy" line.

The input to OR gate 104 comprises the output of AND gates G2, G3, G4 and G5. The inputs to AND gate G2 comprise output line 2 of the decoding network 86, and the false output terminals of each of crosspoint flip-flops A2, B2 and C2. Similarly, the inputs to AND gates G3, G4 and G5 comprise, respectively, output lines 3, 4 and 5 of decoding network 86 and the false output terminals of crosspoint flip-flops A3, B3, C3 and A4, B4, C4, and A5, B5, C5.

The output line of OR gate 104 together with output line 0 of decoding network 72 is connected to the input of OR gate 106. The output of OR gate 106 is connected directly to the input of AND gate 108 and through inverter 110 to the input of AND gate 112. The second input to each of AND gates 108 and 112 constitutes the true output terminal of flip-flop T5 of the sequence control.

The outputs of AND gates 108 and 112 are respectively connected to the inputs of OR gates 113 and 114. The output of AND gate 116 is connected directly to the input of gate 114 and through an inverter to gate 113. The outputs of each of gates 88, 113 and 114, respectively, constituting "not assigned," "request accepted," and "request rejected" lines comprise three of the data output lines of switch control module X1 and accordingly, are connected directly to the crosspoint AND gates as shown in FIG. 5(*a*).

The true output terminal of flip-flop T5 of the sequence control comprises the first input to AND gate 116, the true output terminal of alert flip-flop 118 comprises the second input to AND gate 116, and output line 6 of decoding network 86 comprises the third input to AND gate 116. The true output terminal of flip-flop T6 of the sequence control comprises one input to AND gate 120 while output line 6 of decoding network 86 comprises the second input. The output of AND gate 120 is connected to the set input terminal of alert flip-flop 118. In addition to being connected to AND gate 116, the true output terminal of alert flip-flop 118 is connected directly to controlling modules YA, YB, YC.

Connected to the reset input terminals of crosspoint flip-flops A2–A5 is the output of AND gate 124. Similarly, the outputs of AND gates 126 and 128 are connected to the reset input terminals of flip-flops B2–B5 and C2–C5, respectively. The true output terminal of flip-flop T4 is connected to the input of each of AND gates 124, 126 and 128 together with the true output terminals of flip-flops T1, T2, T3, respectively.

Prior to discussing in detail the operation sequence involved in requesting and establishing connections, the various possibilities arising will be mentioned.

(1) A switch request comprising a connection request which is processed by the switch control module X1 resulting in the setting of a crosspoint flip-flop to establish a communication path between the requesting controlling module and the requested controlled module;

(2) A switch request comprising a disconnect request which is processed by the switch control module X1 to break any previously established communication path involving the requesting controlling module;

(3) A switch request comprising a connection request which does not result in the setting of the crosspoint flip-flop due to the fact that the requested controlled module is "busy"; i.e., already in communication with another controlling module;

(4) A switch request comprising a connection request which does not result in the setting of the crosspoint flip-flop due to the fact that a "not assigned" code is stored in the position in the translation table corresponding to the requested address;

(5) A switch request to set the alert flip-flop which results in the setting of the alert flip-flop; and (6) A switch request to set the alert flip-flop which does not result in the setting of the alert flip-flop due to the fact that the alert flip-flop is already set.

With respect to the first possibility, assume that controlling module YA generates a connection request. This involves setting request line R1 and providing a symbolic address on its data output lines. Request line R1 is sampled during commutation state T1 resulting in the setting of crosspoint flip-flop A1 to establish a communication path between controlling module YA and switch control module X1. The commutator holds commutation state $T_1$ and the sequence control is caused to count out of state $T_6$. The address on the data output lines of controlling module YA is stored in flip-flops D1, D2, D3. This address is decoded by decoding network 72 resulting in one of output lines 1–7 being energized. Assuming output line 1 is energized, the contents of translation table flip-flops A11, A12 and A13 will be read out through gates 80, 82 and 84 into decoding network 86. The address read out of the translation table comprises a physical address of a position on the X axis of the matrix 10. Accordingly, one of output lines 2–5 of decoding network 86 will be energized. Assume that output line 2 is energized.

At time $T_4$ the output of AND gate 124 becomes true thereby resetting crosspoint flip-flops A2–A5. This action, of course, serves to break any still existent previously established communication path between controlling module YA and any controlled module. The energization of output line 2 of decoding network 86 enables gate G2 if crosspoint flip-flops A2, B2, C2 are all false. These crosspoint flip-flops will be false if controlled module X2 is not presently in communication with any controlling module. Assuming that controlled module X2 is not "busy," the output of gate G2 will be true, as will the output or OR gate 104. Similarly, the output of gate 106 will be true. Consequently, at time $T_5$, AND gate 108 is enabled. The output or OR gate 113 comprising the "request accepted" line becomes true. Since the "request accepted" line is connected through a crosspoint AND gate to controlling module YA, the requesting controlling module is apprised of what action was taken upon its request. It is stipulated that upon notification of the accepted request, controlling module YA ceases to generate the switch request on its output lines. Consequently, the sequence control of FIG. 4 switches to state $T_6$. This causes the output of gate 102 (FIG. 5(*b*)) to become true thereby enabling gate 96. As a consequence, gate 90 is enabled and crosspoint flip-flop A2 set to establish a communication path between controlling module YA and controlled module X2. It will also be noted that at time $T_6$, flip-flops D1, D2 and D3 are reset.

The second possibility, involving disconnecting an already established connection without establishing a new connection is similar to the first possibility already discussed except that the symbolic address stored in flip-flops D1, D2 and D3 comprises the arbitrarily defined disconnect address 000. The disconnect address causes the energization of output line 0 of decoding network 72. It will be noted that output line 0 does not control any translation table registers. Accordingly, no physical address is read out of the translation table and through decoding network 86 to set a crosspoint flip-flop. However, inasmuch as the sequence control steps through its cycle in the same manner as if a new communication path was being established, at time $T_4$ any previously established communication path involving the requesting controlling module is broken. Since it is desired to generate a "request accepted" signal even if the switch request comprises only a disconnect request, output line 0 of decoding network 72 does comprise an input to OR gate 106. Accordingly, at time $T_5$, AND gate 108 is enabled causing the output of OR gate 113 to become true thereby advising the requesting controlling module that is disconnect request has been honored.

The third possibility involves the controlling module submitting a connection request which does not result in the setting of a crosspoint flip-flop due to the fact that the requested module is "busy", i.e., already in communication with another controlling module. As with respect to the explanation of the first possibility, it is again assumed that controlling module YA requests communication with controlled module X2. If it is assumed that controlling module YB is already in communication with controlled module X2, then crosspoint flip-flop B2 is of necessity true. Consequently, the energization of output line 2 of decoding network 86 does not enable gate G2 and the output of gate 104 remains false. The output of gate 106 which is also false is connected through inverter 110 to the input of gate 112. Accordingly, at time $T_5$ the output of gate 112 becomes true and as a consequence the output of gate 114 comprising the "request rejected" line is true. As previously pointed out, the "request rejected" line is coupled through a crosspoint AND gate to requesting controlling module YA. Depending upon the particular program criteria in the controlling module YA, the controlling module can go on to perform some other task not involving controlled module X2 or on the other hand, it can withdraw and resubmit its switch request for communication with controlled module X2. In any event, request line R1 goes false permitting the sequence control to assume state $T_6$. Since the output of gate 104 comprising the "not busy" line remains false, the output of gate 102 remains false and accordingly, no crosspoint flip-flop is set.

In a multicomputer modular system of the type with which we are here concerned, it is often essential to prevent communication between certain controlling modules and certain controlled modules. For example, certain of the controlling modules may be processing information which is classified under security restrictions. Certain of the other controlling modules may be processing data which is not so classified. It is essential therefore to prevent classified data which may, for example, be stored in a tape unit, perhaps controlled module X3, from being accessed by a controlling module which is processing and outputting non-classified data. In order to restrict access between certain controlling modules and certain controlled modules, use is made of the available translation table provided for converting symbolic addresses to physical addresses. For example, assume that controlling module YB is not supposed to have access to controlled module X2. If it be remembered that the controlling module can establish communication only with those controlled modules whose physical addresses are stored in the portion of the translation table to which it has access, it follows that in order to prevent communication between controlling module YB and controlled module X2, it is merely necessary to assure that the physical address of controlled X2 does not appear in group A of the translation table.

The assignment capability is additionally useful in establishing a master-slave relationship between the various system controlling modules. That is, it is often desirable to designate one of the controlling modules as a master controlling module and program it so as to oversee the system operation. Particularly, it is very desirable to provide a master controlling module for housekeeping chores, i.e., the scheduling of tasks for the other controlling modules in the light of indicated priorities, the recognizing of task completions, etc. In designating a controlling module as the master controlling module, it is desirable to provide it with the capability of modifying the translation table so as to control assignments. The translation table is modified through use of the translation table controlled module X2. Attention is called to FIG. 6 wherein the internal details of controlled module X2 are illustrated. Controlled module X2 includes a decoding network 130 whose input comprises the data input lines from the X2 sets of crosspoints. Inasmuch as the translation table includes 21 registers, five decoding network input lines are necessary to select a particular register out of the 21. In addition to the five lines necessary to select a particular translation table register, three input lines are provided for carrying the information which is to be stored in the selected register. Accordingly, let us assume that controlling module YA establishes a communication path through the switch matrix with controlled module X2 in the manner discussed under the first possibility. If controlling module YA desires to modify the physical address in the first register of group C in the translation table for example, it will present a code on the five input lines to the decoding network 130 which designates register 1 of group C. In addition, it will provide on input lines 132, 134 and 136 the address information which it desires to enter into the selected register. Associated with each flip-flop in the translation table is a pair of AND gates in the controlled module X2. The pair of AND gates are respectively coupled to the set and reset input terminals of the translation table flip-flop. Each of the 21 output lines from decoding network 130 is therefore connected to the inputs of the 6 AND gates associated with the three flip-flops of the corresponding register. Input lines 132, 134 and 136 are directly coupled to the AND gates connected to the set input terminals of the translation table flip-flops and are connected through inverters to the AND gates connected to the reset input terminals of the translation table flip-flops. Accordingly, when one of the 21 output lines of the decoding network 130 is selected, the address presented on lines 132, 134 and 136 will be entered into the selected register. In this manner, a master controlling module is able to modify the translation table and accordingly effect the assignments of the other controlling modules. It will be apparent that in order to limit this master capability to a single designated controlling module, it is merely necessary to initially restrict acces to the translation table control module X2 to the desired controlling module. More particularly, if it is desired that controlling module YA be the master controlling module, then it is merely necessary to assure that the physical address of controlled module X2 does not appear in groups B and C of the translation table. In this manner, when either of controlling modules YB and YC requests communication with unassigned controlled module X2, it will be notified that it has requested communication with a controlled module which is not assigned to it. This brings us to the operational sequence involved with respect to the fourth and fifth possiblities.

Let us now assume that controlling module YB requests communication with controlled module X2. The operational sequence is identical to that involved under the first possibility up to the point of the information read out of the translation table. Since the requested controlled module was not assigned to the requesting controlled module, a physical address of 000 will be read out of the translation table causing output line 0 of decoding network 86 to be energized. At time $T_5$, AND gate 88 is enabled and its output line comprising the "not assigned" line becomes true. Since the "not assigned" line is connected through the crosspoint AND gates to the requesting controlling module, the controlling module is advised that it requested an unassigned controlled module. The requesting controlling module can be programmed to alert an operator of the fact or to alert the master controlling module.

In a multicomputer modular system of the type here disclosed, it is desirable to provide means by which any controlling module can alert another controlling module of certain occurrences. For example, it is sometimes desirable that a controlling module be able to alert a master controlling module of the fact that a controlled module with which it desired communication was not assigned to it or of the fact that it has completed its most recently assigned task. In conjunction with the capability of alerting a master controlling module, it is desirable that some scratch pad means, which may comprise a controlled drum module X5, be utilized. For example, the last steps involved in every task can comprise (1) request communication with scratch pad (2) write in the scratch pad information identifying the writing controlling module and the occurrence with respect to which the master controlling is being alerted, and (3) then alert the master controlling module. In turn, the master controlling module must be capable of (1) recognizing an alert, (2) requesting communication with scratch pad, and (3) ascertaining from the information written on the scratch pad the occurrence of which it is being apprised and the controlling module involved.

In order to implement this alert capability, an alert flip-flop 118 is provided. The set input terminal of alert flip-flop 118 is connected through AND gate 120 to an output line 6 of decoding network 86 while the reset input terminal of alert flip-flop 118 is coupled to output line 7 of the decoding network 86. Assume that controlling module YB has completed a task and desires to alert master controlling module YA of the task completion. To do this, it makes a switch request causing the ultimate energization of output line 6 of decoding network 86. If the alert flip-flop is already true, at time $T_5$, the output of AND gate 116 will be true and the "request rejected" line comprising the output of OR gate 114 will become true advising requesting module YB that its request has been rejected. On the other hand, if the alert flip-flop was not already true, at time $T_6$ the alert flip-flop is set. The true output terminal of the alert flip-flop is directly connected to each of the controlling modules. However, the master controlling module can be the only one programmed to recognize the setting of the alert flip-flop. In accordance with the example above mentioned, the master controlling module upon recognizing that the alert flip-flop has been set, can reset the alert flip-flop by energizing output line 7 of decoding network 86. Also, it will be realized that if the alert flip-flop 118 has been set inadvertently by any of the controlling modules and such controlling module recognizes its error, it may reset the alert flip-flop.

It should be understood that although only one alert flip-flop is illustrated herein, several may, in fact, be utilized such that the setting of each alert flip-flop can apprise the master controlling module of a particular condition, accordingly lessening the need for extensive reading and writing on a scratch pad.

Summarizing, applicants have provided herein improvements in modular computer systems. Particularly, applicants have suggested herein the utility of commutating means for sequentially sampling controlling module requests. In addition, the utility of a translation table for performing both symbolic to physical address conversions and assignment functions has been pointed out. Still further, applicants have herein provided means whereby a master-slave controlling module relationship can be established including means for giving a single controlling module the capability of modifying the translation table. Still further, means have been suggested for permitting system controlling modules to alert other controlling modules when necessary.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. A data processing system comprising:
(a) a plurality of controlled modules;
(b) a plurality of controlling modules each capable of generating a plurality of different switch request output signals;
(c) each of said switch request signals including symbolic address signals;
(d) means for converting said symbolic address signals to physical address signals;
(e) and means responsive to said physical address signals for establishing a communication path between the controlling module generating said signals and the controlled module identified by said physical address signals.

2. A data processing system comprising:
(a) a plurality of controlled modules;
(b) a plurality of controlling modules each capable of generating a plurality of different switch request output signals;
(c) each of said switch request signals including symbolic address signals;
(d) a translation table including a plurality of storage registers each storing physical address signals;
(e) means responsive to each of said symbolic address signals for reading out the contents of the register uniquely associated therewith;
(f) and means responsive to said physical address signals for establishing a communication path between the controlling module generating said signals and the controlled module identified by said physical address signals.

3. A data processing system comprising:
(a) a plurality of controlled modules;
(b) a plurality of controlling modules each capable of generating a plurality of different switch request output signals;
(c) each of said switch request signals including symbolic address signals;
(d) a translation table including a plurality of storage registers each storing physical address signals;
(e) means for modifying said physical address signals stored in said translation table;
(f) means responsive to each of said symbolic address signals for reading out the contents of the register uniquely associated therewith;
(g) and means responsive to said physical address signals for establishing a communication path between the controlling module generating said signals and the controlled module identified by said physical address signals.

4. A data processing system comprising:
(a) a plurality of controlled modules;
(b) a plurality of controlling modules each capable of generating a plurality of different switch request output signals;

(c) and means responsive to said switch request signals for establishing communication paths between requesting controlling modules and requested controlled modules; said means comprising a switch control module and a rectangular switch matrix defining a plurality of normally open crosspoints; said switch control module including means responsive to said switch request signals for closing selected crosspoints to establish communication paths.

5. A data processing system comprising:

(a) a plurality of controlled modules;

(b) a plurality of controlling modules each capable of generating a plurality of different switch request output signals, each such output signal including a set of symbolic address signals;

(c) means responsive to said switch request signals for establishing communication paths between requesting controlling modules and requested controlled modules; said means comprising a switch control module and a rectangular switch matrix defining a plurality of normally open crosspoints; said switch control module including means responsive to said switch request signals for closing selected crosspoints to establish communication paths;

(d) and translation table means within said switch control module for converting each set of symbolic address signals to a set of physical address signals designating a unique crosspoint.

6. A data processing system comprising:

(a) a plurality of controlled modules;

(b) a plurality of controlling modules each capable of generating a plurality of different switch request output signals;

(c) commutator means for sequentially sampling the outputs of each of said controlling modules;

(d) and means responsive to said switch request signals for establishing communication paths between requesting controlling modules and requested controlled modules.

7. The combination of claim 6 wherein said last-mentioned means comprises a switch control module and a rectangular switch matrix defining a plurality of normally open crosspoints; said switch control module including means responsive to said switch request signals for closing selected crosspoints to establish communication paths.

8. The combination of claim 6 wherein said last-mentioned means comprises a switch control module and a rectangular switch matrix defining a plurality of normally open crosspoints; said switch control module including means responsive to said switch request for closing selected crosspoints to establish communication paths;

(a) each of said switch request signals including symbolic address signals;

(b) and translation table means within said switch control module for converting said symbolic address signals to physical address signals designating selected crosspoints.

9. A data processing system comprising:

(a) a plurality of controlled modules;

(b) a plurality of controlling modules each capable of generating a plurality of different switch request output signals;

(c) a rectangular switching matrix defining horizontal and vertical axes and comprising a plurality of normally open communication paths interconnecting positions on the horizontal axis with positions on the vertical axis; means connecting said controlling modules to positions on the vertical axis and said controlled modules to positions on the horizontal axis;

(d) and means comprising a switch control module connected to said horizontal axis and responsive to said switch request signals for closing selected normally open communication paths designated by said switch request signals.

10. A data processing system comprising:

(a) a plurality of controlled modules;

(b) a plurality of controlling modules each capable of generating a plurality of different switch request output signals, each such output signal including a set of symbolic address signals;

(c) a rectangular switching matrix defining horizontal and vertical axes and comprising a plurality of normally open communication paths interconnecting positions on the horizontal axis with positions on the vertical axis; means connecting said controlling modules to positions on the vertical axis and said controlled modules to positions on the horizontal axis;

(d) and a switch control module connected to said horizontal axis and including means for converting each set of symbolic address signals to a set of physical address signals and means responsive to each different set of physical address signals for closing a different one of said normally open communication paths.

11. A data processing system comprising:

(a) a plurality of controlled modules;

(b) a plurality of controlling modules each capable of generating a plurality of different switch request output signals, each such output signal including a set of symbolic address signals;

(c) a rectangular switching matrix defining horizontal and vertical axes and comprising a plurality of normally open communication paths interconnecting positions on the horizontal axis with positions on the vertical axis; means connecting said controlling modules to positions on the vertical axis and said controlled modules to positions on the horizontal axis;

(d) a switch control module connected to said horizontal axis and including means for converting each set of symbolic address signals to a set of physical address signals; means responsive to each different set of physical address signals for closing a different one of said normally open communication paths;

(e) said means for converting said symbolic address signals to physical address signals comprising a translation table including a plurality of storage registers each storing a set of physical address signals and means responsive to each set of symbolic address signals for reading out the contents of a register uniquely identified thereby whereby communication between certain controlling modules and certain controlled modules can be prevented by deleting the physical address signals identifying said certain controlled module from the translation table.

12. The combination of claim 9 wherein said normally open communication paths include logical AND gates and said means for closing them comprises a crosspoint flip-flop whose output is connected to the input of said AND gates.

13. A data processing system comprising:

(a) a plurality of controlled modules;

(b) a plurality of controlling modules each capable of generating a plurality of different switch request output signals;

(c) a rectangular switching matrix defining horizontal and vertical axes and comprising a plurality of normally open communication paths interconnecting positions on the horizontal axis with positions on the vertical axis; means connecting said controlling modules to positions on the vertical axis and said controlled modules to positions on the horizontal axis;

(d) and means responsive to certain switch request signals permitting one controlling module to alert another controlling module

14. The combination of claim 13 wherein said means for alerting controlling modules includes an alert flip-flop and means responsive to switch request signals for setting and resetting said alert flip-flop.

15. A data processing system comprising:

(a) a plurality of controlled modules;

(b) a plurality of controlling modules each capable of generating a plurality of different switch request output signals, each such output signal including a set of symbolic address signals;

(c) a rectangular switching matrix defining horizontal and vertical axes and comprising a plurality of normally open communication paths interconnecting positions on the horizontal axis with positions on the vertical axis; means connecting said controlling modules to positions on the vertical axis and said controlled modules to positions on the horizontal axis;

(d) a switch control module connected to said horizontal axis and including means for converting each set of symbolic address signals to a set of physical address signals; means responsive to each different set of physical address signals for closing a different one of said normally open communication paths;

(e) said means for converting said symbolic address signals to physical address signals comprising a set of translation table including a plurality of storage registers each storing physical address signals and means responsive to each set of symbolic address signals for reading out the contents of a register uniquely identified thereby;

(f) and means for modifying said physical address signals stored in said translation table.

16. The combination of claim 15 wherein said last-named means comprises a translation table control module connected to said horizontal axis.

17. A data processing system comprising:

(a) a plurality of controlled modules;

(b) a plurality of controlling modules each capable of generating a plurality of different switch request output signals, each such output signal including a set of symbolic address signals;

(c) a rectangular switching matrix defining first and second axes and comprising a plurality of normally open communication paths interconnecting positions on the first axis with positions on the second axis;

(d) means connecting said controlled modules to positions on the first axis and said controlling modules to positions on the second axis;

(e) a switch control module connected to a predetermined one of said positions on said first axis;

(f) means responsive to a switch request output signal provided by one of said controlling modules for closing the communication path between said controlling module providing said output signal and said switch control module to thereby couple a set of symbolic address signals to said switch control module;

(g) means in said switch control module responsive to said set of symbolic address signals coupled thereto for providing a set of physical address signals identifying a position on said first axis;

(h) means responsive to said provided set of physical address signals for opening said communication path to said switch control module and for closing the communication path to said identified position on said first axis; and (i) means inhibiting the closing of said communication path in response to said physical address signals in the event the controlled module connected to the identified first axis position is connected through a closed communication path to a controlling module.

18. The data processing system of claim 17 including means responsive to the provision of a switch request output signal for selectively generating an accepted signal and a rejected signal; and means coupling said accepted and rejected signals to the controlling module providing said switch request output signal.

19. The data processing system of claim 17 wherein said means responsive to said switch request output signal includes commutator apparatus for cyclically defining a plurality of different states; and means coupling each of said controlling modules to said switch control module during a different one of said states.

References Cited by the Examiner

UNITED STATES PATENTS

| | | | |
|---|---|---|---|
| 2,903,513 | 9/1959 | Phelps | 340—172.5 X |
| 2,910,238 | 10/1959 | Miles | 340—172.5 X |
| 2,969,522 | 1/1961 | Crosby | 340—172.5 X |
| 3,076,181 | 1/1963 | Newhouse | 340—172.5 X |

ROBERT C. BAILEY, *Primary Examiner.*

R. B. ZACHE, *Assistant Examiner.*